US011805315B2

(12) United States Patent
LeBeau et al.

(10) Patent No.: US 11,805,315 B2
(45) Date of Patent: Oct. 31, 2023

(54) SEMI-TRANSPARENT DETECTOR ARRAY FOR AUTO-FOCUSED NIGHTVISION SYSTEMS

(71) Applicant: L3Harris Technologies, Inc., Melbourne, FL (US)

(72) Inventors: James A. LeBeau, Tempe, AZ (US); Jay Scott Tucker, Chandler, AZ (US); Jon D. Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 91 days.

(21) Appl. No.: 17/490,983

(22) Filed: Sep. 30, 2021

(65) Prior Publication Data

US 2023/0101352 A1 Mar. 30, 2023

(51) Int. Cl.
*H04N 23/67* (2023.01)
*G06T 7/13* (2017.01)
*G06T 7/70* (2017.01)
*G06V 10/25* (2022.01)
*H04N 23/611* (2023.01)
*G02B 7/36* (2021.01)
*G02B 23/12* (2006.01)

(52) U.S. Cl.
CPC ............ *H04N 23/671* (2023.01); *G02B 7/36* (2013.01); *G02B 23/12* (2013.01); *G06T 7/13* (2017.01);
(Continued)

(58) Field of Classification Search
CPC ......... H04N 5/232121; H04N 5/23219; H04N 23/67; H04N 23/671; H04N 23/672;
(Continued)

(56) References Cited

U.S. PATENT DOCUMENTS 4,974,003 A 11/1990 Ohnuki et al.
7,969,673 B2 6/2011 Hanna et al.
(Continued)

FOREIGN PATENT DOCUMENTS

CN 108337430 A 7/2018
CN 110749989 A 2/2020
(Continued)

OTHER PUBLICATIONS

U.S. Appl. No. 16/868,306, Jacob Becker, Backside Etch Process for Transparent Silicon Oxide Technology, May 6, 2020.
(Continued)

*Primary Examiner* — Christopher K Peterson
(74) *Attorney, Agent, or Firm* — Workman Nydegger

(57) ABSTRACT

A nightvision system includes an underlying device that provides output light in a first spectrum. A transparent optical device transmits light in the first spectrum from the underlying device through the transparent optical device. The transparent optical device includes an active area of a semiconductor chip. The active area includes active elements that cause the underlying device to detect light from the underlying device and transparent regions formed in the active area which are transparent to the light in the first spectrum to allow light in the first spectrum to pass through from the underlying device to a user. An image processor processes images produced using light detected by the first plurality of active elements. An autofocus mechanism coupled to the image processor focuses the input light into the underlying device based on image processing performed by the image processor.

20 Claims, 5 Drawing Sheets

(52) U.S. Cl.
CPC ............... *G06T 7/70* (2017.01); *G06V 10/25* (2022.01); *H04N 23/611* (2023.01); *G06T 2207/10028* (2013.01); *G06T 2207/30201* (2013.01)

(58) Field of Classification Search
CPC .. H04N 23/673; H04N 23/674; H04N 23/675; H04N 23/676; G02B 7/36; G02B 23/12; G06T 7/13; G06T 7/70; G06T 2207/10028; G06T 2207/30201; G06V 10/25
See application file for complete search history.

(56) References Cited

U.S. PATENT DOCUMENTS

| | | | |
|---|---|---|---|
| 2020/0034591 A1* | 1/2020 | Bachelder | G06K 7/10811 |
| 2020/0169653 A1 | 5/2020 | Jones et al. | |
| 2020/0400944 A1* | 12/2020 | Burnsed | H04N 23/45 |

FOREIGN PATENT DOCUMENTS

| | | |
|---|---|---|
| EP | 2006733 B1 | 5/2013 |
| WO | WO2003060590 A2 | 7/2003 |

OTHER PUBLICATIONS

Anonymous: "Autofocus—Wikipedia", Retrieved from https://web.archive.org/web/20210812122049/https://en.wikipedia.org/wiki/Autofocus, Retrieved on Feb. 4, 2023, pp. 10.

Anonymous: "Automatically in focus—IDS Imaging Development Systems GmbH", Retrieved from https://en.ids-imaging.com/techtipp-de tails/ueye_le_automatic_focus.html, Retrieved on Feb. 7, 2023, pp. 5.

European Search Report received for EP Patent Application No. 22196442.2, dated Feb. 16, 2023, 12 pages.

Mark Galer's Alpha Creative Skills: "Focus Peaking and Magnify Focus—Sony Alpha Tutorial", Nov. 14, 2014, pp. 2.

\* cited by examiner

SEMI-TRANSPARENT DETECTOR ARRAY FOR AUTO-FOCUSED NIGHTVISION SYSTEMS

BACKGROUND

Background and Relevant Art

Nightvision systems allow a user to see in low-light environments without external human visible illumination. This allows for covert vision in a low-light environment to prevent flooding the environment with human visible light and/or protects the user from being detected due to causing human visible light or light that is otherwise detectable to other nightvision systems to be emitted.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Typical nightvision systems include manual focus adjustment. In particular, a user will operate a focus adjustment knob to adjust focal lengths between an input objective and the photocathode of the image intensifier. However, in the high stress situations in which nightvision systems are often used, a user may not have a free hand available to perform such manual adjustments and/or such manual adjustments may be inconvenient as the user is focused on performing other activities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a nightvision system. The nightvision system includes an underlying device that is configured to provide output light in a first spectrum from input light received at the underlying device. A transparent optical device is optically coupled in an overlapping fashion to the underlying device. The transparent optical device is configured to transmit light in the first spectrum from the underlying device through the transparent optical device. The transparent optical device includes an active area of a single semiconductor chip. The active area includes active elements configured to cause the underlying device to detect light from the underlying device and transparent regions formed in the active area which are transparent to the light in the first spectrum to allow light in the first spectrum to pass through from the underlying device to a user. The transparent regions are configured in size and shape to cause the transparent optical device to have a first transmission efficiency for light in the first spectrum. An image processor configured to process images produced using light detected by the first plurality of active elements is coupled to the transparent optical device. An autofocus mechanism is coupled to the image processor. The autofocus mechanism configured to focus the input light into the underlying device based on image processing performed by the image processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to using a transparent optical device in conjunction with nightvision equipment, such as an image intensifier (or other nightvision system). The transparent optical device includes light detection functionality that is able to detect images by detecting light produced by the nightvision equipment. Further, the transparent optical device is transparent to light produced by the nightvision equipment to allow the images to be transmitted to a user. Using the detected image, embodiments can perform autofocus functionality, such as by using features such as object edge detection, object recognition, identifying regions of interest, etc. In particular, automatic focusing functionality can be performed to improve contrast, or based on various items detected by the transparent optical device. Note that in some embodiments, the transparent optical device may further include display functionality for overlaying additional information on an image produced by the nightvision equipment.

Figure 1:
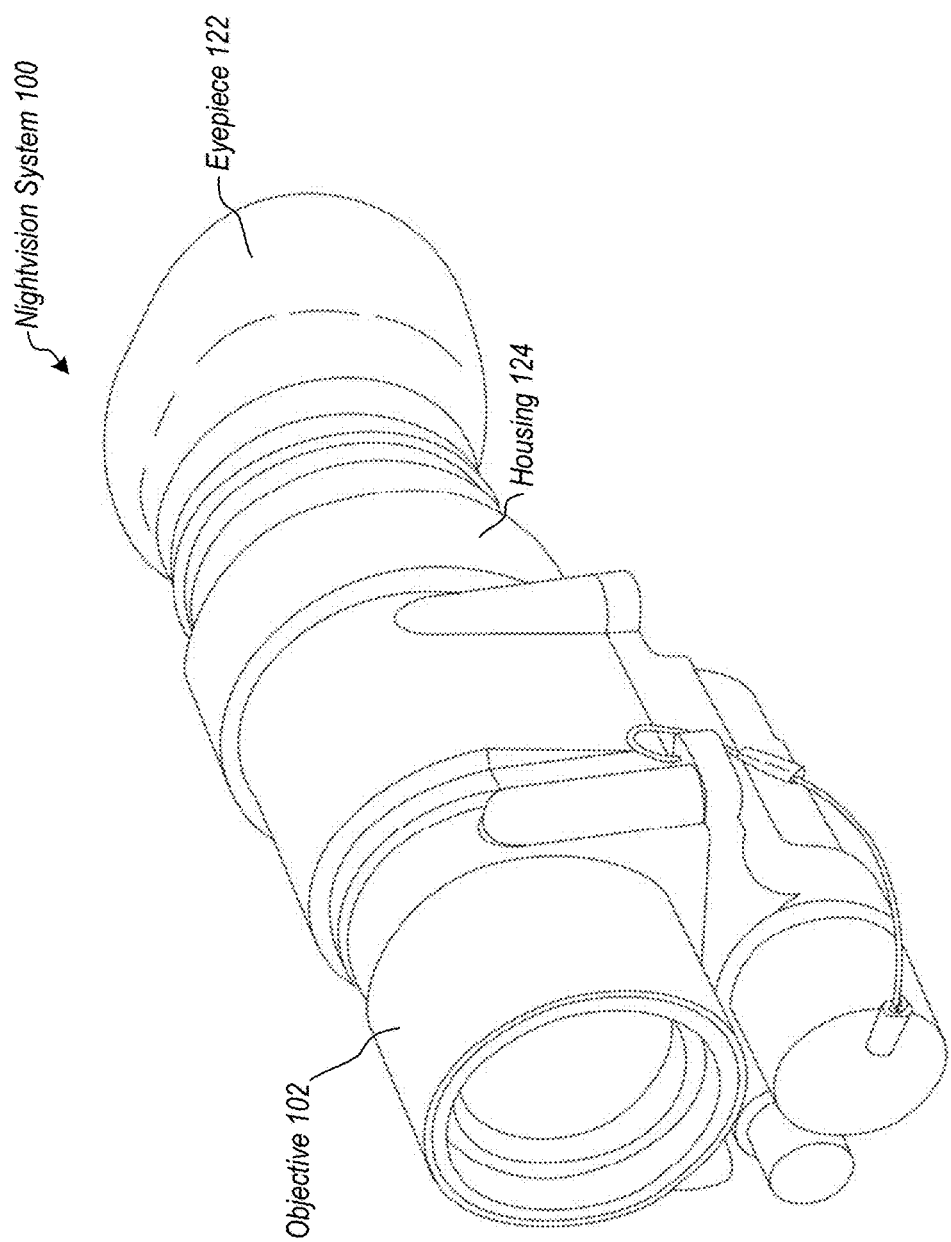
FIG. 1 illustrates a nightvision system.

Additional details are illustrated. Attention is now directed to FIG. 1, where a specific example of a nightvision system is illustrated. In particular, FIG. 1 illustrates the PVS-14 nightvision system 100. In the example illustrated, the nightvision system 100 includes a housing 124. As will be illustrated in more detail below in other figures, the housing 124 houses an image intensifier, a transparent optical device (see e.g., FIGS. 3A and 3B and transparent optical device 118), and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for focusing images created by the nightvision system 100, including images created by an image intensifier and images created by a transparent optical device, into the eye of the user.

Figure 2:
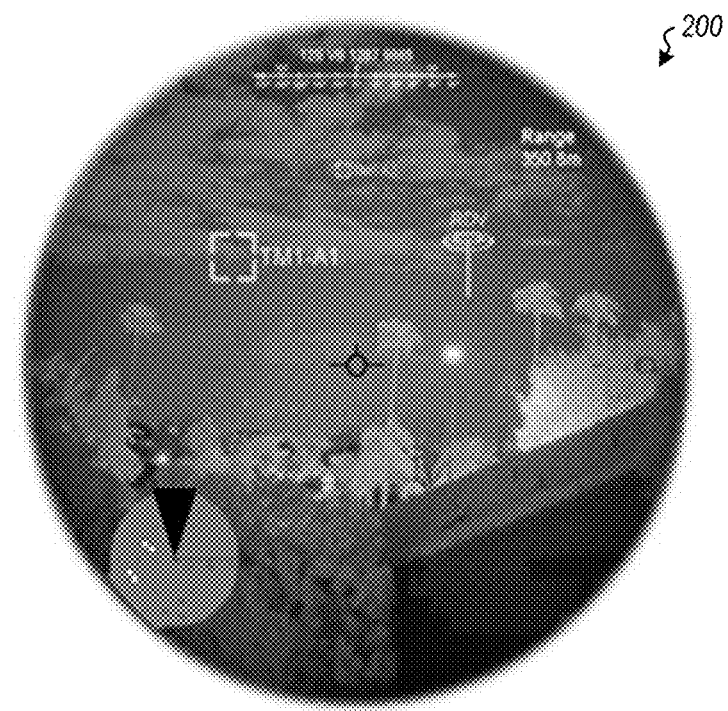
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an intensifier tube. Some embodiments described herein are directed to implementing a heads-up display implemented by adding image overlay capabilities with a nightvision system, where the image overlay capabilities are added by using transparent optical device including a display.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc. In some embodiments, the heads-up display can superimpose thermal image data over intensified light images. In particular, a nightvision system 100 may include (or at least have access to data from) thermal cameras for detecting thermal characteristics in an environment. Data from thermal cameras can be used to control the transparent optical device 118 to display thermal imaging data, correlated with artifacts in intensified light images, to the user. For example, various colors can be used to represent various temperatures where the colors are output by the transparent optical device 118 to the user. The colors are overlaid on intensified light image artifacts to indicate temperature of objects in an environment. Note that the transparent optical device 118 (or other elements) may include photodetectors for detecting intensified light to determine the locations of various objects in the field of view. This information can be used for autofocus functionality as described above and in more detail below, correlating thermal colors, target indicators, or other images output by the transparent optical device 118.

Figure 3A:
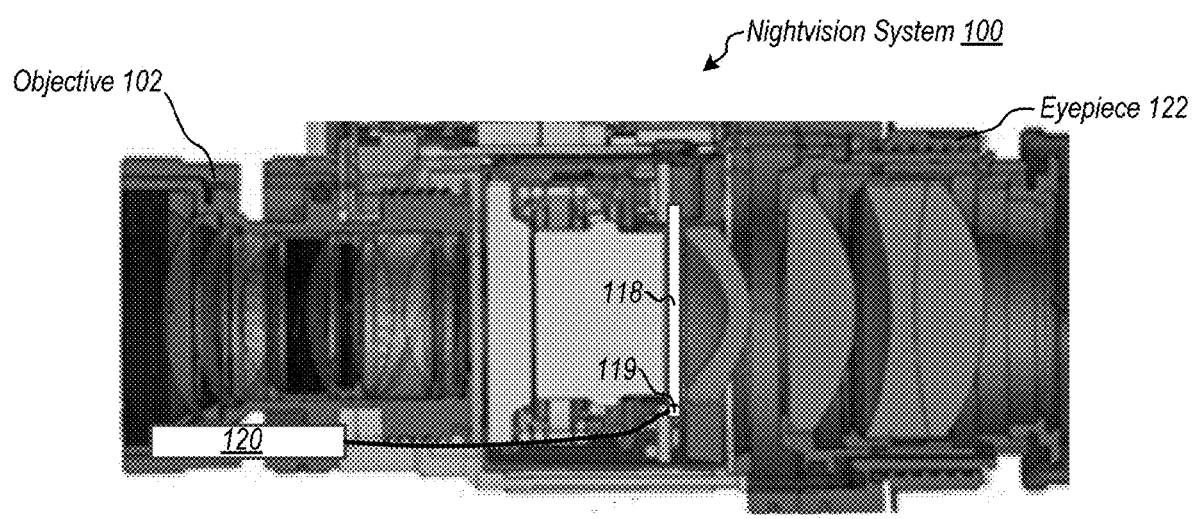
FIG. 3A illustrates a cutaway diagram of components of a nightvision system.
Figure 3B:
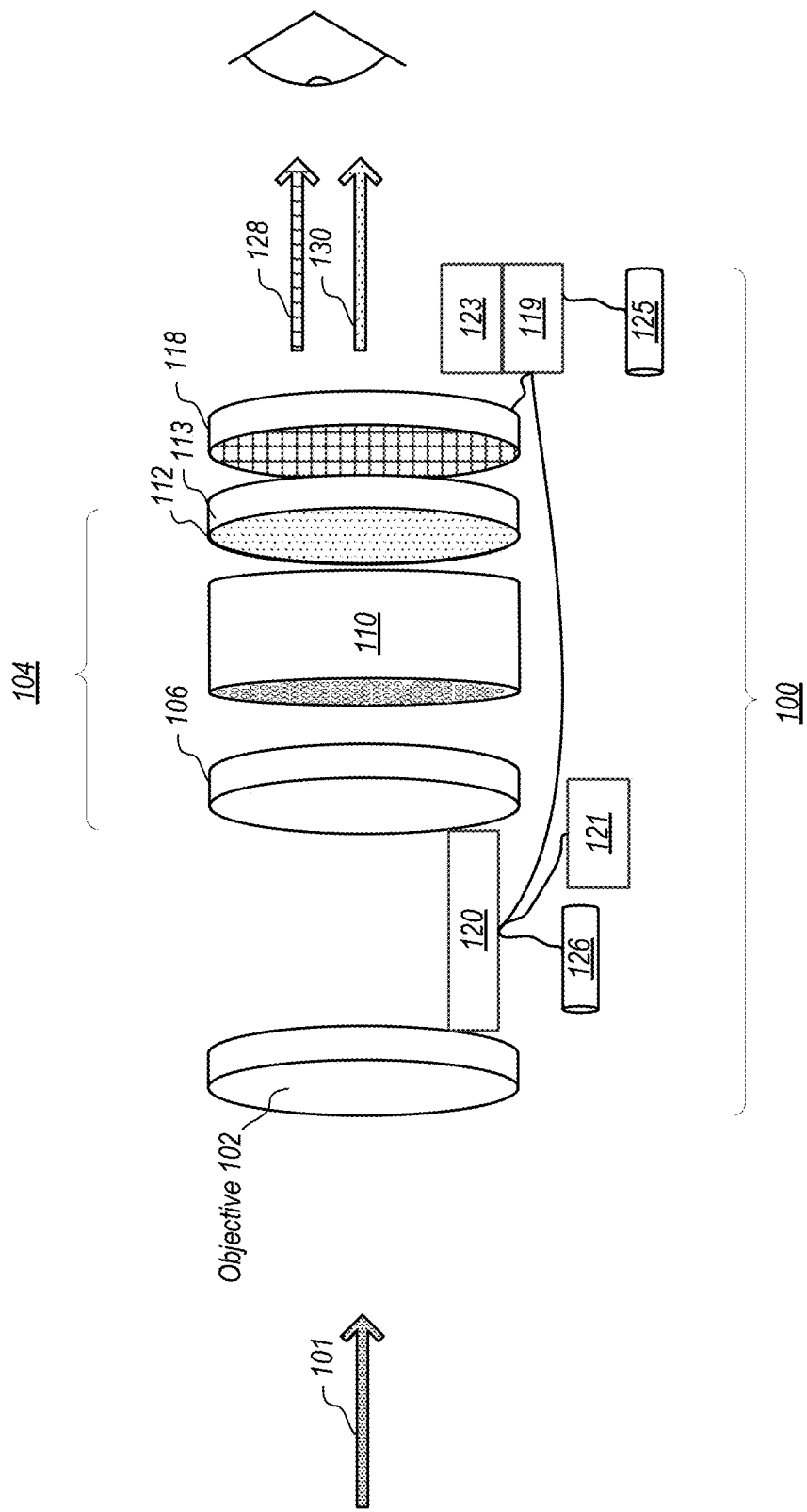
FIG. 3B illustrates a block diagram of components of a nightvision system.

Attention is now directed to FIGS. 3A and 3B. FIGS. 3A and 3B illustrate a cutaway and a block diagram respectively of a nightvision system 100. A nightvision system typically includes an objective to focus input light 101 into an underlying device 104. In this example, the underlying device 104 is an image intensifier, but it should be appreciated that in other embodiments, the underlying device 104 may be other types of nightvision devices, such as IR CCD cameras, CMOS cameras, and the like. Such input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not viewable in the viewable spectrum for human observers. A third source of light may be light emitted by an object itself. For example, this may be related to infrared heat energy emitted by the object and directed into the objective. Nonetheless, the nightvision system is able to convert the light emitted from the source into a viewable image for the user.

The objective directs any input light 101 into the underlying device 104. Note that the underlying device 104 may include functionality for amplifying light received from the objective to create a sufficiently strong image that can be viewed by the user. This may be accomplished using various technologies such as a photocathode 106, a microchannel plate 110, and a phosphor screen 112. The photocathode 106 may be configured to generate photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1) of a nightvision system where it can be output to the user. This fiber-optic 113 can be twisted 180 degrees to undo the inversion caused by the system objective to allow for convenient direct viewing of the screen.

FIGS. 3A and 3B further illustrate the transparent optical device 118. The transparent optical device 118 allows intensified light to pass through the transparent optical device 118, but also, in some embodiments, generates its own light, from LEDs or other light emitters, to transmit to a user. Creating a transparent optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

The transparent optical device 118 is typically implemented behind the fiber-optic 113 (i.e., closer to the eyepiece than the fiber-optic 113), but in other embodiments may be implemented in front of the fiber-optic 113. The use of a fiber-optic within nightvision systems inverts and translates the focal plane allowing the transparent optical device 118 overlay to be presented on either side without impacting the ability for the eyepiece to focus on the image. However, certain manufacturing or mechanical constraints may incentivize placement of the transparent optical device 118 behind the fiber-optic including the difficulty in inserting electronics within the vacuum package. Placing the transparent optical device 118 external to the fiber-optic can be done to allow the transparent optical device 118 to be applied after the image intensifier tube has been manufactured and sealed, lowering production difficulties. As discussed above, the transparent optical device 118 may include functionality for displaying information to a user. Such information may include graphical content, including text, images, and the like. In some embodiments, the transparent optical device 118 may display in shaded monochrome. Alternatively, or additionally, the transparent optical device 118 may display in multiple colors. Alternatively, or additionally, the transparent optical device 118 may display in 1-bit monochrome.

In the example illustrated in FIGS. 3A and 3B, the transparent optical device 118 outputs display light 128 which can be sent to the eyepiece (such as the eyepiece 122 illustrated in FIG. 1). As noted previously, the intensified light is also provided to the eyepiece. Thus, an image such as that illustrated in FIG. 2 is presented to the user in the nightvision system.

As noted previously, the transparent optical device 118 is composed of active silicon elements. The active elements cause the device to have certain optical performance capabilities. Such capabilities may be one or more of abilities to output color output, output monochrome output, detect light, have a certain pixel density, have a certain pitch, etc. In particular, the transparent optical device 118 is a digital detector and potentially display having a certain pixel density of for the detector and potentially the display. Often, each pixel is implemented on a single active island, although in other embodiments, an island may have multiple pixels, or even only a single sub-pixel element. Each pixel may have one or more transistors controlling one or more OLED emitters (or other light emitting devices). Pixels may additionally or alternatively include light detectors. This can be useful for detecting the intensified light from the phosphor screen 112. This detected light can be used for autofocus functionality and/or to characterize an image intensifier image. For example, the detected light can be used for recording scene events. Alternatively or additionally, the detected light can be used for improving placement of elements displayed on the heads-up display shown in FIG. 2. For example, edge detection techniques may be used using the detected light, and images generated and displayed by the transparent optical device 118 can be keyed off of these detected edges.

In any case, the transparent optical device 118 is representative of a stacked device formed in a single semiconductor chip that overlaps an underlying device 104, in this case, the underlying device 104 is an image intensifier. The transparent optical device 118 is transparent to light in a first spectrum (according to some predefined transmission efficiency), which in this case is the visible spectrum of light output by the phosphor screen 112. That is, the transparent optical device 118 is not fully transparent due to the blocking of the active devices, but transparency referred to herein refers to at least partial transparency according to some transmission efficiency. Note that overlapping as used herein means that elements are in the same optical path. This can be accomplished by having elements be in coaxial alignment when the optical path is straight. Alternatively, this can be accomplished by using various waveguides or other elements to align optical paths thus not requiring physical coaxial alignment.

When implementing a photodetector, the photodetector absorbs a portion of the intensified light converting it to an electrical signal. For example, the photodetector can be a two-dimensional array of light detectors, such as photodiodes, that generates a charge current, or any other form of digital data level proportional to intensity of the intensified light as a function of position. Accordingly, the photodetector may generate a two-dimensional array of electrical charge that represents the intensified image. In some embodiments, this two-dimensional array of electrical charge can be periodically read from the photodetector (e.g., the detected signal can be read from the photodetector like in a charged coupled device (CCD) camera). In some embodiments, the two-dimensional array of electrical signals from the photodetector is processed (such as by the image processor 119) and/or used locally, e.g., within the transparent optical device 118, at the readout or pixel levels, to modulate in real time the amplitude of the display light 128 emitted from the transparent optical device 118.

Figure 4:
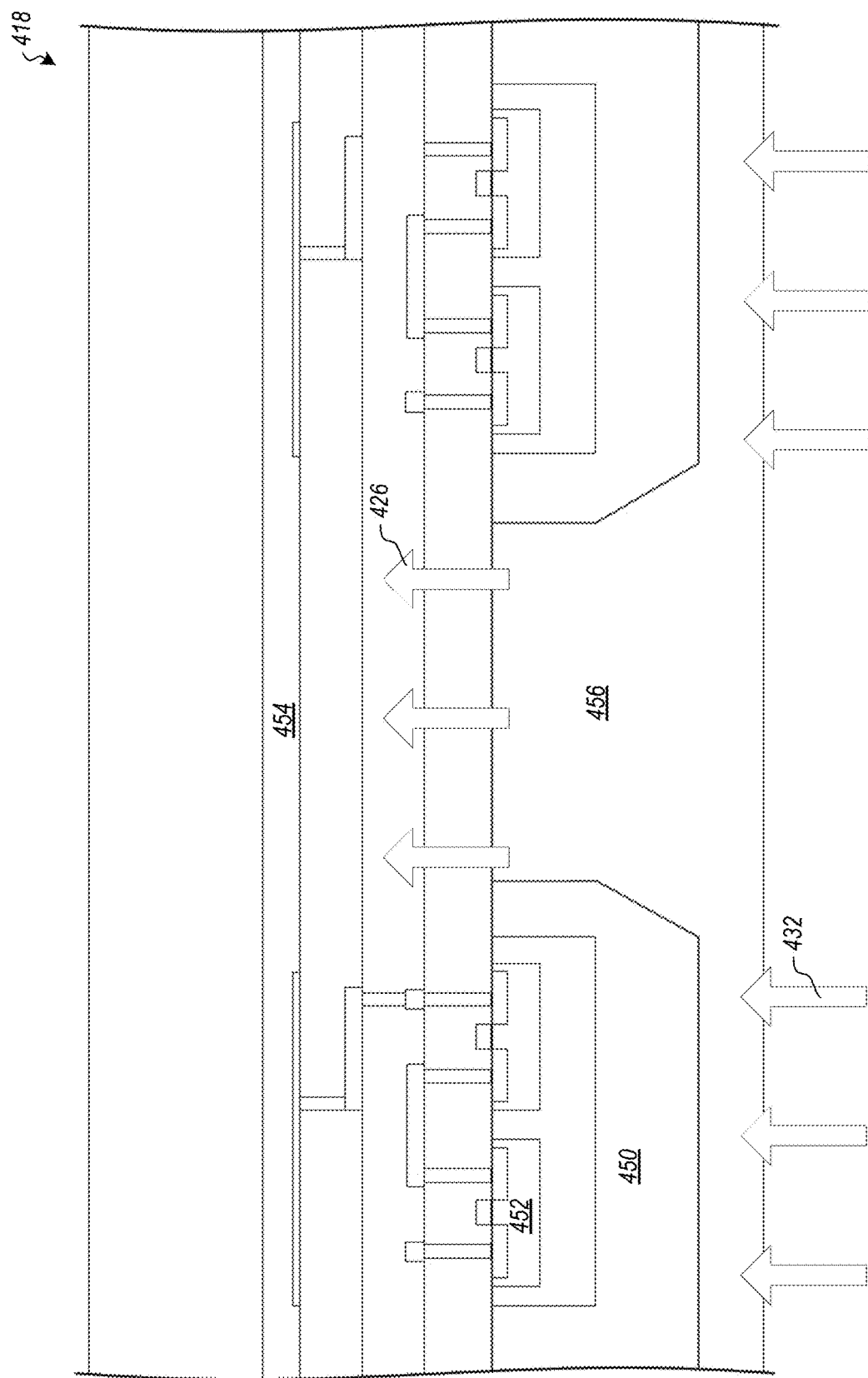
FIG. 4 illustrates a transparent display structure cross-section view, including transparent regions.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials. For example, reference is now made to FIG. 4 which illustrates a transparent optical device 418 including active silicon islands (which may be native silicon islands) such as active silicon island 450. In particular, active silicon islands include transistors such as transistor 452 which control detectors and potentially OLED emitters in an OLED stack 454. In the example illustrated in FIG. 4, each of the active silicon islands represents a pixel or sub-pixel of the transparent optical device 418. Thus, an image can be detected by active elements in the active region. Additionally, in some embodiments, by illuminating various LEDs in the OLED stack 454 using the transistors in the active silicon islands, an image can be created and output to a user, such as by outputting display light such as the display lights 128 illustrated in FIG. 3B.

As illustrated in FIG. 3B, intensified light is transmitted through the transparent optical device 118 to the eyepiece of the nightvision system, and then to the user. Note, however, that the intensified light is transmitted to the user through the transparent optical device 118, meaning that the intensified light will be affected by characteristics of the transparent optical device 118. In the example illustrated in FIG. 3B, light 128 represents the light output by the light emitting portions of the transparent optical device 118. Light 130 represents intensified light from the phosphor screen 112 transmitted through the transparent optical device 118.

Referring once again to FIG. 4, light 426 represents a portion of light that is transmitted through transparent regions, illustrated by transparent region 456, of the transparent optical device 418, while light 432 represents a portion of light that is blocked by active portions of the transparent optical device 418. Note that in some embodiments, the transparent region 456 is backfilled with a transparent back fill material.

However, transmission of light through the transparent optical device is nonetheless increased by removing portions of silicon that are not needed for implementing active electrical components or for supporting metal traces. For example, consider an example where dynamic pixel cells are used. In this particular example, assume that there are two sub pixels per pixel. Anode size for the sub pixels is 8 µm×5.1 µm. Pixel area is 10.1 µm×12.4 µm. Pixel pitch is 22.5 µm×22.5 µm. In one example, this provides a resolution of 800×800. In this particular transparent optical device, if non-active silicon islands (not shown) that are typically implemented are not removed, transparency of the transparent optical device is about 33%. In contrast, transparency is about 61% if the non-active silicon islands are removed such as in the structure illustrated in FIG. 4. Thus, in this example, transparency of a transparent optical device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that transparent optical device will have a lower transparency than an equivalently sized transparent optical device with a lower resolution. Thus, for example, a transparent optical device with a 36 μm pitch can obtain a transparency of 81%, while a transparent optical device of 22.5 μm pitch can obtain a transparency of 67%, while a transparent optical device having a 17.5 μm pitch will be about 55% transparency when non-active silicon islands are removed from the transparent optical device in each of the illustrated examples. Thus, some embodiments may be able to create a transparent optical device with at least a 36 μm pitch with at least a transparency of 75%, or a transparent optical device of at least a 22.5 μm pitch with at least a transparency of 60%, or a transparent optical device having at least a 17.5 μm pitch with at least a 50% transparency when silicon is removed between active silicon islands. The preceding illustrates one specific example related to a particular manufacturing process.

Pitch and transparency values may be specific to a given semiconductor manufacturing process—also known as the technology or process node—and will of course vary as the node changes. Typically designating the process's minimum feature size, the technology node will dictate the area of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

In the example illustrated in FIG. 3B, light 101 is input into the objective 102, where it is transmitted to an underlying device 104, in this case, an image intensifier. FIGS. 3A and 3B further illustrates the transparent optical device 118. As noted previously, the transparent optical device 118 includes light detectors that are able to detect light produced by the underlying device 104. FIGS. 3A and 3B further illustrates an image processor 119. The image processor 119 is able to process images produced by the detectors in the transparent optical device 118.

The image processor 119 is further connected to an autofocus mechanism 120. The autofocus mechanism 120 is configured to adjust the focal length between the objective 102 in the underlying device 104. This will change the focus of various objects in the image seen produced by the underlying device 104.

Thus, embodiments include a nightvision system 100. The nightvision system 100 includes an underlying device 104. For example, an image intensifier is an example of an underlying device. Note that other underlying devices may be used in addition or alternatively. For example, some embodiments may include infrared CCD based or other nightvision system. The underlying device 104 is configured to provide output light in a first spectrum from input light received at the underlying device 104. Thus for example, the first spectrum may be light produced by the phosphor screen 112.

The nightvision system 100 includes a transparent optical device, such as transparent optical device 118, optically coupled in an overlapping fashion to the underlying device 104. The transparent optical device 118 is configured to transmit light in the first spectrum from the underlying device 104 through the transparent optical device 118. The transparent optical device 118 includes: an active area of a single semiconductor chip.

The active area includes a plurality of active elements configured to cause the underlying device 104 to detect light from the underlying device 104. For example, as described above, light detectors integrated into a photodetector may be used to detect light from the underlying device 104.

The transparent optical device 118 further includes a plurality of transparent regions formed in the active area which are transparent to the light in the first spectrum to allow light in the first spectrum to pass through from the underlying device 104 to a user. The transparent regions are configured in size and shape to cause the transparent optical device 118 to have a particular transmission efficiency for light in the first spectrum.

The nightvision system further includes an image processor, such as image processor 119 coupled to the transparent optical device 118. The image processor is configured to process images produced using light detected by the plurality of active elements.

The nightvision system further includes an autofocus mechanism, such as autofocus mechanism 120, coupled to the image processor. The autofocus mechanism is configured to focus the input light into the underlying device 104 based on image processing performed by the image processor.

As noted previously, the nightvision system may be implemented where the underlying device 104 comprises an image intensifier.

The nightvision system may be implemented where the autofocus mechanism includes a motorized lens adjustment. For example, the autofocus mechanism 120 may be configured to move the objective 102 physically closer to, or further away from the microchannel plate 106 of the underlying device 104. Alternatively, or additionally, the autofocus mechanism may include a liquid lens adjustment. These types of devices can change the focal length without actual changing the physical distance by changing lens characteristics between devices such as the objective 102 and the microchannel plate 106.

In some embodiments, the nightvision system may be implemented where the autofocus mechanism configured to focus the input light into the underlying device 104 based on coarse autofocus factors and/or fine autofocus factors. In some such examples, the fine autofocus factors are based on the image processing performed by the image processor. While the coarse autofocus factors are based on other inputs or analysis. As used herein coarse and fine are relative terms used with respect to each other. That is, coarse autofocus is more coarse than fine autofocus and fine autofocus is more fine than coarse autofocus. In some embodiments, this can mean that a coarse autofocus is performed first to attempt to achieve an initial level of focus while fine autofocus is thereafter performed to fine tune the autofocus operation.

For example, in some embodiments, the nightvision system may include an orientation sensor 121 coupled to the autofocus mechanism 120. In such examples, the coarse autofocus factors are based on information received from the orientation sensor 121. Such orientation sensors may include one or more of accelerometers, gyroscopes, magnetometers, internal measurement units, combinations thereof, and the like. Coarse autofocus functionality is performed as a result of detecting orientation information. This could be a change in orientation (e.g., a change of a certain number of degrees in one or more axis), satisfaction of a condition of absolute orientation, or combinations thereof.

Note that this type of coarse autofocus may be useful when large differences in focal length of a scene is required. For example, consider a case where a user desires infinite focal length when scanning a horizon, but then looks down at handheld items, the ground, or their feet, where the user desires a focal length range of between 1 and 2 meters. Thus, some embodiments may include functionality for performing a coarse autofocus function to focus from infinite focal length to a 1 to 2 meter focal length as a result of orientation information obtained from an orientation sensor.

In some embodiments, the nightvision system may include a ranging sensor 126. In some such examples, the coarse autofocus factors are based on information received from the ranging sensor 126. The ranging sensor 126 can include elements such as lasers, lidar, radar, sonar, combinations thereof, or other ranging equipment. Thus, coarse autofocus functionality can be performed as a result of detecting ranging information to autofocus for a focal length dependent on a distance of objects of interest.

Note that while in typical embodiments coarse and fine autofocus functionality can be performed, it should be appreciated that in other embodiments, any of the focusing factors and mechanisms may be used individually or in combination. Thus, in some embodiments, autofocus functionality is performed based on using the orientation sensor 121 without using information from the image processor 119. Alternatively, autofocus functionality is performed based on using the ranging sensor 126 without using information from the image processor 119. Alternatively, autofocus functionality is performed based on using the image processor 119 without using information from the orientation sensor 121 or the ranging sensor 126. Further, it should be appreciated that embodiments may use both the orientation sensor 121 and the ranging sensor 126 to perform coarse autofocus functionality and then sequentially use information from the image processor 119 to perform fine autofocus functionality.

The nightvision system may be implemented where the image processor performs edge detection. For example, such edge detection may be implemented using Sobel edge detection and/or Canny edge detection. In some such embodiments, the autofocus mechanism is configured to focus the input light into the underlying device 104 based on the edge detection. Thus, for example, embodiments may be configured to focus the input light in an attempt to cause edges to have a particular characteristic as determined by the edge detection.

In some embodiments, the nightvision system may be implemented where the image processor performs object recognition. In some such embodiments, the autofocus mechanism is configured to focus the input light into the underlying device 104 based on the object recognition. This can be implemented in a number of different fashions. For example, in some embodiments the nightvision system may be configured to perform autofocus functionality for a largest object detected in a nightvision scene. Alternatively, embodiments may be configured to perform autofocus functionality based on detection and classification of objects. For example, the image processor 119 may be able to identify that a certain object detected in a nightvision scene is likely a stop sign while a different object detected in the nightvision scene is likely a human. In this example, an algorithm may be implemented to cause the autofocus mechanism 120 to focus on the object detected as a human while deprioritizing, and thus not focusing, on the object detected as a stop sign. Note that in some embodiments, the nightvision system 100 may include functionality for allowing user input to specify priorities when determining autofocus functionality. For example, for specific missions, a user may wish to prioritize autofocus functionality for objects classified as vehicles over objects classified as humans. Alternatively, a user may wish to prioritize autofocus functionality for objects classified as animals over objects classified as humans. Thus, a user can specific priorities, and autofocus functionality will autofocus on preferred objects recognized by the system.

Alternatively, or additionally, in some embodiments a user may be able to specify specific objects and not simply a classification of objects. For example, a user may be able to specify information to particularly identify a particular human based on height, weight, build, posture, or other characteristics. Thus, some embodiments may be able to specifically perform autofocus functionality when the image processor 119 detects, within some acceptable probability, that a detected object can be classified as a specific object, such as a specific human. Similar functionality can be used for sub classifications of objects. For example, a user could specify autofocus functionality should be prioritized for trucks whereas other vehicles such as cars, motorcycles, etc. are not prioritized as highly for autofocus functionality.

The nightvision system 100 may be implemented where the image processor performs region of interest detection. In some such embodiments, the autofocus mechanism is configured to focus the input light into the underlying device 104 based on the region of interest detection. These embodiments may be similar to the object detection embodiments above but focused on regions as opposed to specific objects.

The nightvision system 100 may be implemented where the nightvision system comprises an eye tracker 123 coupled to the image processor 119 to track a user's eye with respect to the processed images produced by the image processor. In some such embodiments, the autofocus mechanism configured to focus the input light into the underlying device 104 based on tracking a user's eye with respect to the processed images produced by the image processor. In particular, embodiments can determine what objects a user is looking at in a nightvision scene using the eye tracker 123 and can perform autofocus functionality on those objects based on that determination.

The nightvision system 100 may be implemented where the nightvision system 100 comprises an aiming laser 125 coupled to the image processor to facilitate aiming the nightvision system. In some such embodiments, the autofocus mechanism 120 is configured to focus the input light into the underlying device 104 based on tracking the aiming laser 125 with respect to the processed images produced by the image processor 119.

In some embodiments the nightvision system 100 may be implemented where the autofocus mechanism is configured to provide information to a user to indicate to the user manual focus adjustments that can be made with respect to focusing the input light into the underlying device 104. For example, as discussed previously, the transparent optical device 118, may include not only detector functionality, but may also include display functionality. Thus, using the display functionality, information may be output to the user to indicate to the user that manual adjustments should be performed to bring certain objects, regions, etc. into focus for the user. In a similar embodiment, the display functionality may be able to highlight, such as by pointing to and/or outlining an object that is in focus. A user can then select other objects to focus on. Selection of these other objects can be performed by using a user interface to select the object in the nightvision scene, which can be used to cause the autofocus mechanism 120 automatically adjust focal lengths to focus on the selected object. Alternatively, or additionally, the user can simply perform a manual override to manually focus on a particular object based on information presented to the user using the display functionality of the transparent optical device 118.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
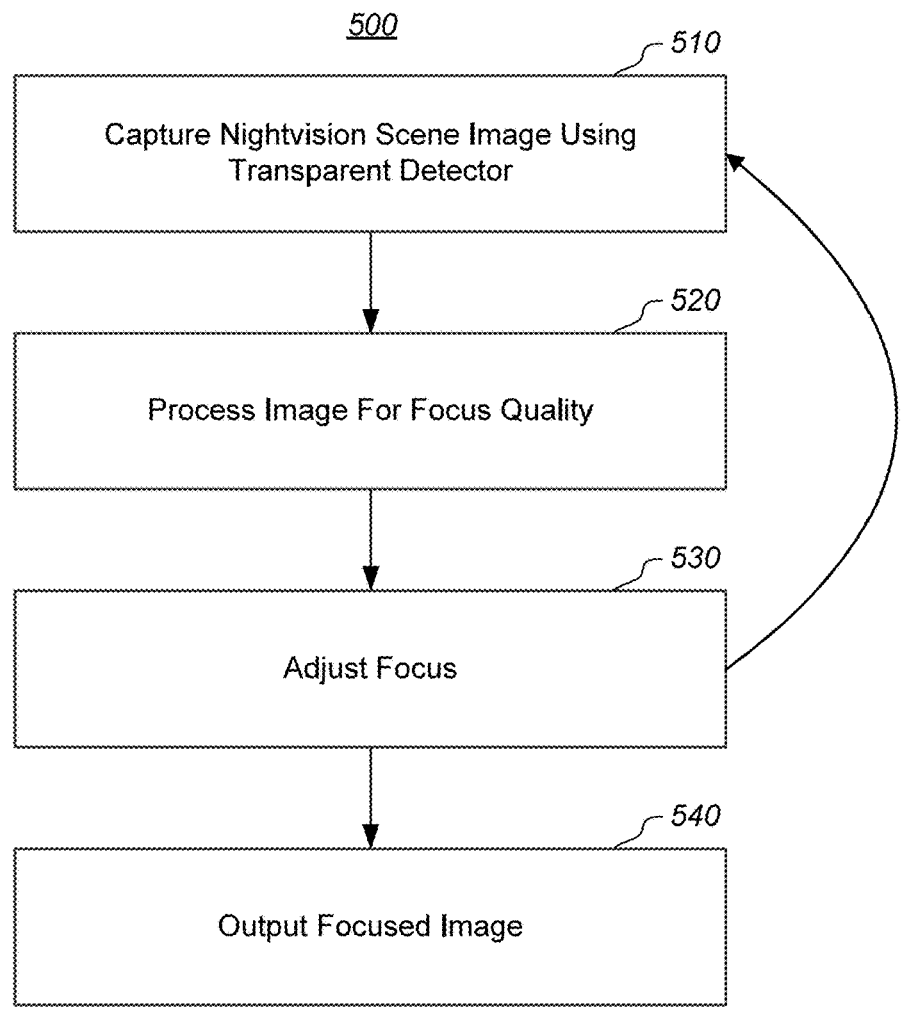
FIG. 5 illustrates a method of performing autofocus functionality in a nightvision system using transparent optical devices.

Referring now to FIG. 5, a method 500 is illustrated. The method 500 includes capturing a nightvision scene image using a transparent detector (act 510). For example, the transparent optical device 118 may be used to capture a nightvision scene as described above. The method 500 includes processing an image for focus quality (act 520). For example, the image processor 119 can determine focus quality of the captured nightvision scene. The method 500 may further include adjusting focus based (act 530) based on the processing of act 520. Acts 510-530 can be repeated as needed to perform autofocus functionality. The method 500 further includes outputting a focused image (act 540).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A nightvision system comprising:
an underlying device, the underlying device configured to provide output light in a first spectrum from input light received at the underlying device;
a transparent optical device optically coupled in an overlapping fashion to the underlying device, wherein the transparent optical device is configured to transmit light in the first spectrum from the underlying device through the transparent optical device, the transparent optical device comprising: an active area of a single semiconductor chip, the active area comprising:
a first plurality of active elements configured to cause the underlying device to detect light from the underlying device; and
a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for light in the first spectrum; and
the nightvision system further comprising an image processor configured to process images produced using light detected by the first plurality of active elements;
an autofocus mechanism coupled to the image processor, the autofocus mechanism configured to focus the input light into the underlying device based on image processing performed by the image processor; wherein the autofocus mechanism is configured to focus the input light into the underlying device based on coarse autofocus factors and fine autofocus factors wherein the fine autofocus factors are based on the image processing performed by the image processor; and
an orientation sensor, the orientation sensor comprising at least one of an accelerometer, gyroscope, magnetometer, or internal measurement unit, and wherein the coarse autofocus factors are based on information received from the orientation sensor such that coarse autofocus functionality is performed as a result of detecting orientation information.

2. The nightvision system of claim 1, wherein the underlying device comprises an image intensifier.

3. The nightvision system of claim 1, wherein the autofocus mechanism comprises a motorized lens adjustment.

4. The nightvision system of claim 1, wherein the autofocus mechanism comprises a liquid lens adjustment.

5. The nightvision system of claim 1, wherein the image processor performs edge detection, and wherein the autofocus mechanism configured to focus the input light into the underlying device based on the edge detection.

6. The nightvision system of claim 1, wherein the image processor performs object recognition, and wherein the autofocus mechanism configured to focus the input light into the underlying device based on the object recognition.

7. The nightvision system of claim 1, wherein the image processor performs region of interest detection, and wherein the autofocus mechanism configured to focus the input light into the underlying device based on the region of interest detection.

8. The nightvision system of claim 1, wherein the nightvision system comprises an eye tracker coupled to the image processor to track a user's eye with respect to the processed images produced by the image processor, and wherein the autofocus mechanism configured to focus the input light into the underlying device based on tracking a user's eye with respect to the processed images produced by the image processor.

9. The nightvision system of claim 1, wherein the nightvision system comprises an aiming laser coupled to the image processor to facilitate aiming the nightvision system, and wherein the autofocus mechanism configured to focus the input light into the underlying device based on tracking the aiming laser with respect to the processed images produced by the image processor.

10. The nightvision system of claim 1, wherein the autofocus mechanism is configured to provide information to a user to indicate to the user manual focus adjustments that can be made with respect to focusing the input light into the underlying device.

11. A method of performing autofocus functionality in a nightvision system, the method comprising:

providing output light, from an underlying device, in a first spectrum from input light received at the underlying device;

transmitting the light in the first spectrum through a transparent optical device optically coupled in an overlapping fashion to the underlying device, through an active area of a single semiconductor chip, through a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for the light in the first spectrum;

receiving input from an orientation sensor indicating an orientation of the nightvision system, the orientation sensor comprising at least one of an accelerometer, gyroscope, magnetometer, or internal measurement unit;

performing coarse autofocus of the input light into the underlying device based on the orientation of the nightvision system;

detecting light from the underlying device using a first plurality of active elements configured in the active area;

processing images produced using light detected by the first plurality of active elements at an image processor; and performing fine autofocus of the input light into the underlying device based on image processing performed by the image processor using an autofocus mechanism coupled to the image processor.

12. The method of claim 11, wherein processing images comprises using at least one of edge detection, object recognition, region of interest detection, eye tracking, or laser aiming and wherein the autofocus mechanism configured to focus the input light into the underlying device based on the least one of edge detection, object recognition, region of interest detection, eye tracking, or laser aiming.

13. The method of claim 11, wherein the autofocus mechanism is configured to provide information to a user to indicate to the user manual focus adjustments that can be made with respect to focusing the input light into the underlying device.

14. A method of manufacturing a nightvision system comprising:

coupling a transparent optical device optically, in an overlapping fashion, to an underlying device, the underlying device configured to provide output light in a first spectrum from input light received at the underlying device, wherein the transparent optical device is configured to transmit light in the first spectrum from the underlying device through the transparent optical device, the transparent optical device comprising: an active area of a single semiconductor chip, the active area comprising:
a first plurality of active elements configured to cause the underlying device to detect light from the underlying device; and
a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for light in the first spectrum; and coupling an image processor to the transparent optical device, the image processor configured to process images produced using light detected by the first plurality of active elements; and coupling an autofocus mechanism to the image processor, the autofocus mechanism configured to focus the input light into the underlying device based on image processing performed by the image processor; wherein the autofocus mechanism is configured to focus the input light into the underlying device based on coarse autofocus factors and fine autofocus factors wherein the fine autofocus factors are based on the image processing performed by the image processor; and coupling an orientation sensor to the autofocus mechanism, the orientation sensor comprising at least one of an accelerometer, gyroscope, magnetometer, or internal measurement unit, and wherein the coarse autofocus factors are based on information received from the orientation sensor such that coarse autofocus functionality is performed as a result of detecting orientation information.

15. The method of claim 14, wherein the underlying device comprises an image intensifier.

16. The method of claim 14, wherein the autofocus mechanism comprises a motorized lens adjustment.

17. The method of claim 14, wherein the autofocus mechanism comprises a liquid lens adjustment.

18. The method of claim 14, wherein the image processor performs edge detection, and wherein the autofocus mechanism configured to focus the input light into the underlying device based on the edge detection.

19. The method of claim 14, wherein the image processor performs object recognition, and wherein the autofocus mechanism configured to focus the input light into the underlying device based on the object recognition.

20. The method of claim 14, wherein the image processor performs region of interest detection, and wherein the autofocus mechanism configured to focus the input light into the underlying device based on the region of interest detection.

* * * * *